UNITED STATES PATENT OFFICE.

EUGENE CORNELIUS SULLIVAN, OF CORNING, NEW YORK.

MANUFACTURE OF GLASS.

990,607. Specification of Letters Patent. Patented Apr. 25, 1911.

No Drawing. Application filed July 12, 1909. Serial No. 507,105.

*To all whom it may concern:*

Be it known that I, EUGENE CORNELIUS SULLIVAN, a citizen of the United States, residing at Corning, county of Steuben, and State of New York, have invented certain new and useful Improvements in the Manufacture of Glass; and I do hereby declare the following to be a full, clear, and exact description of the invention, such as will enable others skilled in the art to which it appertains to make and use the same.

As is commonly known, lead glass is glass containing up to fifty per cent. of lead oxid, combined with silica ($SiO_2$) and alkalis, such as potassa ($K_2O$), and is at present made by melting together lead oxid (either in the form of litharge, ($PbO$); or minium, ($Pb_3O_4$) with a pure sand and potash. The oxids of lead used for this purpose must be of a special purity, being made from special brands of best refined lead, and they command a high price. The manufacture of these oxids is a tedious and costly operation, deleterious to the health of the workmen. The handling and mixing of the lead oxids with the glass forming the charge is also accompanied by the escape of lead oxid dust into the air, so that poisoning of the workmen is not infrequent. Furthermore, the lead oxids do not dissolve rapidly and uniformly in the glass mixture and it requires the highest skill of the melter to produce glass of fairly homogeneous composition and density.

The object of the present invention is to incorporate lead into glass in the manufacture of lead glass, by using as the direct source of the lead, the cheap natural lead sulfid or galena ($PbS$), the most common ore of lead. As at present practiced, this ore is first reduced by a complicated set of metallurgical reactions to crude metallic lead; the latter is then refined either by fire processes or by electrical refining; the refined lead of high purity is then oxidized in special furnaces to lead oxid; and finally, the latter is mixed with glass forming materials and melted together therewith to form lead glass as hereinbefore indicated.

My invention consists in first purifying, if necessary, the native lead sulfid ore (galena) by washing, jigging, or other mechanical or chemical operations, so as to remove from it, in particular, any iron minerals associated with it. This operation is, in general, cheap and easy to perform and involves no operation not commonly known and practiced in the purification and concentration of metallic minerals. The purified lead sulfid is then mixed, in proper proportions with silica of such quality as is suitable for glass making, or with any other suitable difficultly fusible substance, such as feldspar. This mixture of lead sulfid and silica (or of lead sulfid and feldspar), both of the required purity for a lead glass charge (excepting the sulfur present), is then roasted in any suitable form of roasting furnace, at the speed and temperature best adapted for removing the sulfur most completely from the roasted material. I have found, for instance, that by hand roasting a mixture of three parts by weight of sand to one part by weight of galena in a reverberatory furnace, at a temperature rising to between 900 degrees and 1,000 degrees centigrade, and allowing the roasting material to remain about twenty-four hours in the furnace, with stirring at intervals of one hour, the sulfur remaining has been reduced to 0.05 per cent., furnishing a practically pure lead product, pure enough to satisfy the very exacting requirements of the lead glass maker.

I believe that the strict conditions as to purity of the materials, and the high elimination of sulfur which my experiments have shown possible, are outside of any recorded facts or experience in the metallurgical roasting of galena ore, and that I am the first to demonstrate that a lead-bearing material, practically free from sulfur and sufficiently pure for glass making purposes, can be practically produced in the manner described.

The lead-bearing substance, which I thus produce, is of a granular, non-dusty and sintered form. The small grains appear to be almost entirely of quartz with a more or less irregularly distributed "pebble-dash" surface of lead silicate. Some of the grains carry more of silicate than others and the silicate shades into the quartz rather gradually, showing all gradations of concentration. At the outer surface the silicate is apparently a pure component, judging from its refractive index, and the roasted product as a whole appears clean, and sufficiently uniform for the purposes intended.

In compounding, and thereafter handling, storing, or transporting from one part of the works to another a batch made with lead silicate, the mixture is found to take on and maintain greater uniformity of distribution of the ingredients throughout the mass than when litharge is employed; for the reason, that the specific gravity of the lead silicate more nearly corresponds to that of the remaining constituents.

A further advantage to be gained by the use of lead silicate in the manufacture of lead glass is that it is free from metallic lead, which is present up to one-half of one per cent. and more even in the best commercial litharge, and also to some extent in minium. This metallic lead tends to give the glass a darker color, and, furthermore, it tends to shorten the life of the glass-melting pot by eating through the pot wall.

Throughout the entire operation, there is no grinding, mixing or handling of litharge or minium, thus avoiding lead oxid dust from those sources and its poisonous effects on the workmen. There are, moreover, only two operations necessary in passing from the purified ore to the glass. I believe, moreover, that the glass produced is more homogeneous than if made by attempting to dissolve free lead oxid in glass.

In manufacturing lead glass containing lime, the lime (used as lime, limestone, or gypsum) may be mixed with the silica and lead sulfid and thus participate in the roasting operation; or the lime, limestone or gypsum alone may be mixed with the lead sulfid and roasted therewith, the silica being introduced later in the glass fusion operation; or the lime, limestone or gypsum may be excluded from the roasting operation and used only in the final fusion to glass. Such variations fall within the generic principle of the process devised by me, which is essentially to roast the lead sulfid, thoroughly mixed with a difficultly fusible substance, under test conditions as to purity of the roasted product, and then to use this roasted product in glass making.

Having thus described my invention, what I claim is:

1. The method of manufacturing glass, consisting in roasting a mixture of lead sulfid and a difficultly fusible substance appropriate to the manufacture of lead glass, adding to the product of the roasting operation the other ingredients desirable in such manufacture, and fusing the final mixture to a glass; substantially as described.

2. The method of manufacturing glass, consisting in roasting a mixture of lead sulfid and silica, adding to the product of the roasting operation the other ingredients desirable in the manufacture of lead glass, and fusing the final mixture to a glass; substantially as described.

3. The method of manufacturing glass, consisting in roasting a mixture of lead sulfid, a silicious substance and a calcium compound (such as lime, limestone, or gypsum), adding to the product of the roasting operation the other ingredients desirable in the manufacture of lead glass, and fusing the final mixture to a glass; substantially as described.

4. The process of manufacturing glass, consisting in roasting a mixture of lead sulfid with a calcium compound (such as lime, limestone, or gypsum), adding to the product of the roasting operation the other ingredients desirable in the manufacture of lead glass, and fusing the final mixture to a glass; substantially as described.

In testimony whereof I affix my signature, in presence of two witnesses.

EUGENE CORNELIUS SULLIVAN.

Witnesses:
JAMES HOARE,
MICHAEL J. MOORE.